(12) United States Patent
Goldberg et al.

(10) Patent No.: US 9,399,378 B2
(45) Date of Patent: Jul. 26, 2016

(54) WHEEL SUSPENSION FOR THE REAR AXLE OF A VEHICLE

(71) Applicant: Audi AG, Ingolstadt (DE)

(72) Inventors: Ruben Goldberg, Ingolstadt (DE); Hans-Jürgen Langhoff, Lenting (DE); Marco Isliker, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/415,466

(22) PCT Filed: Jul. 11, 2013

(86) PCT No.: PCT/EP2013/002047
§ 371 (c)(1),
(2) Date: Jan. 16, 2015

(87) PCT Pub. No.: WO2014/012636
PCT Pub. Date: Jan. 23, 2014

(65) Prior Publication Data
US 2015/0224841 A1     Aug. 13, 2015

(30) Foreign Application Priority Data
Jul. 18, 2012   (DE) .......................... 10 2012 014 196

(51) Int. Cl.
*B60G 3/20*     (2006.01)

(52) U.S. Cl.
CPC .............. *B60G 3/20* (2013.01); *B60G 2200/18* (2013.01); *B60G 2200/184* (2013.01); *B60G 2200/422* (2013.01); *B60G 2200/44* (2013.01); *B60G 2204/129* (2013.01); *B60G 2204/1244* (2013.01)

(58) Field of Classification Search
CPC ................. B60G 3/20; B60G 2200/18; B60G 2204/129; B60G 2200/422; B60G 2200/184; B60G 2200/44; B60G 2204/1244
See application file for complete search history.

(56) References Cited

U.S. PATENT DOCUMENTS 3,362,498 A   1/1968   Allison
3,603,422 A   9/1971   Cordiano
(Continued)

FOREIGN PATENT DOCUMENTS

DE         31 08 482        9/1982
DE         38 09 278        9/1988
(Continued)

OTHER PUBLICATIONS

International Search Report issued by the European Patent Office in International Application PCT/EP2013/002047 on Ausust 23, 2013.

*Primary Examiner* — Drew Brown
(74) *Attorney, Agent, or Firm* — Henry M. Feiereisen LLC

(57) ABSTRACT

A wheel suspension for the rear axle of a vehicle includes a wheel carrier that is steerable in a pivoting range for mounting a wheel, and a plurality of control arms for articulating the wheel carrier to the body of the vehicle, and further a damping device for damping a movement of the wheel carrier relative to the vehicle body. The damping device is connected to the wheel carrier by way of a wheel carrier connection, wherein the wheel carrier connection is arranged in an attachment area of the wheel space of the wheel defined by the pivoting range of the wheel carrier, which, of all areas of the wheel space facing the vehicle body, has the greatest direct distance to the vehicle body.

9 Claims, 3 Drawing Sheets

(56) References Cited

U.S. PATENT DOCUMENTS

| | | | | |
|---|---|---|---|---|
| 3,804,433 | A * | 4/1974 | Scherenberg | B60G 3/20 267/221 |
| 4,457,536 | A * | 7/1984 | Rumpel | B60G 3/26 280/124.144 |
| 4,458,913 | A * | 7/1984 | Rumpel | B60G 3/202 280/124.144 |
| 4,671,531 | A * | 6/1987 | Sautter | B60G 3/202 280/124.109 |
| 4,703,947 | A * | 11/1987 | Tattermusch | B60G 21/055 280/124.106 |
| 4,840,396 | A * | 6/1989 | Kubo | B60G 3/202 280/124.143 |
| 4,878,688 | A | 11/1989 | Kubo | |
| 4,930,804 | A * | 6/1990 | Tattermusch | B60G 3/20 280/124.138 |
| 4,973,075 | A * | 11/1990 | Rori | B60G 3/22 280/124.109 |
| 5,100,165 | A * | 3/1992 | Hespelt | B60G 3/20 280/124.141 |
| 5,292,149 | A | 3/1994 | Luger | |
| 5,421,606 | A * | 6/1995 | Chun | B60G 3/20 280/124.141 |
| 5,498,018 | A | 3/1996 | Wahl et al. | |
| 5,507,510 | A | 4/1996 | Kami et al. | |
| 6,752,409 | B1 * | 6/2004 | Kunert | B60G 3/20 280/124.135 |
| 7,896,372 | B2 * | 3/2011 | Yanagida | B60G 3/20 280/124.135 |
| 7,967,310 | B2 * | 6/2011 | Frasch | B60G 3/20 280/124.134 |
| 8,408,568 | B2 * | 4/2013 | Yanagida | B60G 3/20 280/124.128 |
| 8,646,787 | B2 * | 2/2014 | Langhoff | B60G 3/20 280/124.134 |
| 2005/0258614 | A1 * | 11/2005 | Dove | B60G 3/20 280/124.141 |
| 2006/0237941 | A1 * | 10/2006 | Smith | B60G 3/20 280/124.135 |
| 2009/0160154 | A1 | 6/2009 | Frasch et al. | |
| 2012/0043736 | A1 | 2/2012 | Okamoto et al. | |

FOREIGN PATENT DOCUMENTS

| | | |
|---|---|---|
| DE | 40 20 547 | 1/1992 |
| DE | 44 08 571 | 9/1994 |
| DE | 43 40 557 | 6/1995 |
| DE | 102007063545 | 6/2009 |
| DE | 102010030292 | 12/2011 |
| EP | 1 123 821 | 8/2001 |
| EP | 2 423 009 | 2/2012 |
| JP | 11-048728 | 2/1999 |

\* cited by examiner

WHEEL SUSPENSION FOR THE REAR AXLE OF A VEHICLE

CROSS-REFERENCES TO RELATED APPLICATIONS

This application is the U.S. National Stage of International Application No. PCT/EP2013/002047, filed Jul. 11, 2013, which designated the United States and has been published as International Publication No. WO 2014/012636 and which claims the priority of German Patent Application, Serial No. 10 2012 014 196.3, filed Jul. 18, 2012, pursuant to 35 U.S.C. 119(a)-(d).

BACKGROUND OF THE INVENTION

The present invention relates to a wheel suspension for the rear axle of a vehicle, the rear axle of a vehicle, and a method for positioning the wheel carrier connection of a damper device in the wheel suspension of a vehicle.

Suspensions for vehicles are generally known. For example, DE 10 2010 030 292 A1 shows such a rear axle in principle. It is also already known that the rear axles of vehicles and the corresponding wheel suspensions are arranged to be steerable. Such a steerable rear suspension and a steerable rear axle advantageously enable even large vehicles to more easily stay in a lane and negotiate tighter bends and tighter turning radii. A steerable rear axle also improves road-holding.

However, conventional steerable rear axles or steerable wheel suspensions for rear axles disadvantageously have a negative impact on the width dimensional chain of the vehicle. Providing steerability of the wheel suspension of a rear axle requires, for example, widening of the track of the vehicle or reducing the through-load area between the two outer wheel suspensions. A reduced through-load area reduces the load capacity of the trunk of a vehicle. Widening the track width degrades the aerodynamic characteristic of the vehicle and is also partly undesirable for aesthetic reasons. Interfering in the width dimensional chain is necessary because the wheel attached to the wheel suspension must be able to move in a wheel space due to the steerability. This movability is a pivoting motion about an axis oriented vertically to the vehicle, i.e. about the steering axis. The resulting set wheel space prevents the installation of components in this wheel space, which are otherwise necessary for the technical functionality of the wheel suspension. The conventional wheel suspensions therefore require accepting the increase in track width so that all technical functionalities, in particular the damping and suspension can be maintained in the desired manner.

SUMMARY OF THE INVENTION

It is an object of the present invention to provide a wheel suspension for the rear axle of a vehicle, such rear axle of a vehicle, and a corresponding method for positioning the wheel carrier connection a damper device for the rear axle of a vehicle, which at least partially obviate the above-described disadvantages. In particular, it is an object of the present invention to provide a wheel suspension for the rear axle of a vehicle, such rear axle of a vehicle and a method for positioning the wheel carrier connection of a damper device for the rear axle of a vehicle, which provide a more cost-effective and simpler steerable rear axle that requires the least possible space.

The above object is attained with a wheel suspension for the rear axle of a vehicle, a rear axle of a vehicle and a method for positioning the wheel carrier connection. Additional features and details the invention will become apparent from the claims, the description and the drawings. It will be understood that features and details described in the context of the wheel suspension according to the invention apply vice-versa also to the method of the invention and the rear axle of the invention, so that two-way reference will be made to the disclosure to the individual aspects of the invention.

A wheel suspension according to the invention for the rear axle of a vehicle has a steerable wheel carrier for the attachment of a wheel that can be steered over a pivoting range. Further, a plurality of control arms for the articulation of the wheel carrier on the body of the vehicle is provided. In addition, a damper device for damping movement of the wheel carrier relative to the body is present. The damper device is connected to the wheel carrier via a wheel carrier connection. A wheel suspension according to the invention is characterized in that the wheel carrier connection is arranged in an attachment region of the wheel space of the wheel defined by the pivoting range of the wheel carrier. This attachment region has the greatest direct distance from the vehicle body of all areas of the wheel space facing the vehicle body.

A wheel suspension according to the invention is preferably configured as a five-arm wheel suspension, i.e. it has five different arms for the articulation of the wheel carrier on the body of the vehicle. In particular, these are two transverse control arms, two longitudinal control arms and a tracking arm and a steering arm. Of course, the wheel suspension may always include a driven axle, i.e. a driven wheel carrier.

According to the invention, it is essential that the wheel carrier connection is arranged in the defined attachment region. For this purpose, the wheel space defined by the pivoting range of the wheel carrier wheel must be considered. When a wheel is mounted on the wheel carrier, a pivoting movement, i.e. pivoting for steering the wheel, may take place over the pivoting range caused by the steering the wheel carrier. A so-called wheel space, which the wheel will not leave during all movement situations between the extremes of the pivoting range of steerable wheel carrier, is created by comparing all movements between the two extreme positions, i.e. the full left turn and the full right turn of the steerable wheel carrier and the spring compression of the axle, and by then adding up all positions. In other words, all sections within this wheel space are areas, which can be taken up by the wheel, whereas all areas outside the wheel space cannot be taken up by the wheel.

In accordance with the invention, those areas of the wheel space, i.e. the surface portions of the wheel space facing the body of the vehicle, are compared. In this comparison, the "direct" distance from the vehicle body is emphasized. Each area of the vehicle has different distances from the body in accordance with the viewing direction. The term "direct distance" is to be understood in the context of the present invention as the shortest distance of all these possible distances. Such unambiguous direct distance can thus be determined for each area of the wheel space facing the body of the vehicle. This distance can also be defined as the shortest possible distance between this area and the body of the vehicle. According to the invention, the area having the greatest direct distance will now be selected as an attachment region. This greatest direct distance from the body of the vehicle defines an attachment region where the largest clearance between the wheel space and the body is present. Therefore, the maximized clearance between the wheel space and the vehicle body exactly defines the location in the direction of the width dimensional chain that provides the maximum depth of space for the arrangement of other components. This means that the largest space is available in this area where in particular the damper device can be placed and connected with the damper device by way of the wheel carrier connection.

In accordance with the invention, the damper device can thus be connected via the wheel carrier connection to the wheel carrier at a location which due to the maximized available space maintains the track width as well as the through-load distance for the vehicle. Hence, a steered rear axle can be provided without changing the basic geometric dimensions of the vehicle, while maintaining the known functionalities with respect to the spring and in particular of the damper device.

The wheel carrier connection may according to the invention be connected directly as well as indirectly to the wheel carrier. Thus, the damper device may be directly connected to the wheel carrier via the wheel carrier connection, e.g. in the form of a connecting eye. Alternatively, the damper device may also be connected to one of the connecting rods with the wheel carrier connection and hence indirectly to the wheel carrier by way of this control arm.

A steerable wheel carrier in the context of the present invention is in particular a wheel carrier that can be pivoted in a pivoting range relevant for the rear axle. Such a pivoting range is e.g. in a range of about ±5°.

The inventive arrangement of the damper device and in particular of the wheel carrier connection allows the damper device to be optimally placed with regard to the utilization of the installation space between the wheel space and the vehicle body, thereby effectively preventing a collision between the wheel and the damper device while at the same time utilizing the maximized space.

In particular, according to the present invention, the direct distance is oriented in the direction of an axis perpendicular or substantially perpendicular to the direction of travel of the vehicle. This can also be referred to as a transverse axis of the vehicle. Preferably, the direct distance is oriented in the direction of a drive axle or an articulated drive axle, if such drive axle is present, of the wheel of the wheel suspension, i.e. of the wheel carrier.

According to the invention, a distinction is made between pivoting over the pivoting range of the wheel carrier for steering the wheel and a movement of the wheel in an up-and-down motion which is to be damped by the damper device.

According to the invention, in a wheel space which is essentially toroidally shaped or formed as torus that is closed inside, the wheel carrier connection may attached in the area of the smallest dimension of the wheel space in this transverse direction of the vehicle. Preferably, a saddle point or a saddle region is formed by the wheel space which according to the invention is defined as an attachment region.

Advantageously, the wheel space of the wheel defined for a wheel suspension according to the invention by the pivoting range of the wheel carrier may be symmetrical or essentially symmetrical with respect to a plane of symmetry. The wheel carrier connection of the damper device is arranged in or substantially in this plane of symmetry. This results in a particularly advantageous arrangement with respect to the driving dynamics. In particular, the rotation axis of the wheel in one, in several or in all wheel positions with respect to the pivoting range of the wheel carrier is also located in this symmetry plane. The symmetrical design has the further advantage of providing an additional maximization of the installation space between the wheel space and the vehicle body. The attachment region is then also located in or near the plane of symmetry. The term "attachment region" is to be understood in particular as a small geometrical extension in relation to the overall extension of the surface of the wheel space. In particular, the attachment region is defined as a substantially point-shaped area. However, since a point-shaped attachment, i.e. without any two-dimensional extent, is impossible in a real embodiment, the attachment region refers more particularly to the smallest possible two-dimensional area and/or three-dimensional volume necessary for the force-transmitting connection between the wheel carrier connection and the wheel carrier.

Advantageously, in a wheel suspension according to the invention, a spring device for resilient movement of the wheel carrier relative to the vehicle body may be arranged separately from the damper device in relation to the wheel carrier on the opposite side of the damper device. In other words, according to the invention, the spring functionality is thus separated from the damping functionality. Typically, the geometrical extent of springs in the direction of the diameter is significantly greater than the diameter of damper devices. A benefit in the direction of the height dimensional chain is additionally achieved by separating the spring device from the damper device. Thus, a wheel suspension according to the present invention can reduce the extent in the height dimensional chain by separating the damper device from the spring device in the additionally created space in the width dimensional chain, thereby gaining space or reducing the space requirement of a wheel suspension of the invention in this direction.

It is also advantageous when one of the control arms of the inventive wheel suspension, as explained in the previous paragraph, has a cup-shaped receptacle in which the spring device is supported. This eliminates an additional support device for the spring device and reduces material requirements and especially the weight of a wheel suspension according to the invention. The cup-shaped receptacle is used to support the spring device.

It is also advantageous when in the wheel suspension the damper device is supported in or on the same control arm as the spring device. This also reduces material requirements and especially the weight of a wheel suspension according to the invention. Furthermore, the design of the combination of the damper device and the spring device can be simplified and its response can be improved. Also, compared to conventional components of wheel suspensions, only a single control arm needs to be adapted to provide the desired support locations for the damper device and the spring device. In this embodiment, the connection between the wheel carrier connection and the wheel carrier is an indirect connection, i.e. a connection via a part of the corresponding control arm.

It is also advantageous when in a wheel suspension according to the invention at least one of the control arms has a curved portion which due to its curvature provides and/or enlarges the installation space for the damper device. A curved control arm is in particular curved in a direction so as to have its center of the radius of curvature in the direction of the control arm, in which the area defined as attachment region is also located. In other words, the curved portion of the control arm curves away from the attachment region. This increases or creates space for the damper device. The damper device can then be moved even further toward the wheel space, in particular with respect to the positioning of the wheel carrier connection, since other geometrical forms of the damper device, particularly the damper piston and the damper cylinder, do not conflict with the space for one of the control arms.

It is furthermore advantageous, when in a wheel suspension according to the invention, the wheel carrier connection is arranged such that the ratio between the stroke of the wheel carrier during the relative movement of the wheel relative to the vehicle body and the resultant stroke of the damper device is greater than 0.5:1, preferably greater than 0.6:1, more particular greater than 0.7:1, and preferably greater than 0.8:1. Such a configuration is possible only by positioning the wheel carrier connection according to the invention. In this way, the damper device and the wheel carrier can be positioned particularly close to the wheel, which is highly advantageous as it improves the response of the damping. The damper device can be designed to be simpler and more cost-effective, since it can provide a greater stroke and thus an improved damping characteristic.

A further advantage is achieved when a drive shaft for driving the wheel carrier is provided in a wheel suspension according to the invention. This represents a driven wheel suspension or, when used for a rear axle, a driven rear axle of the vehicle. Of course, it is in principle also possible to use wheel suspensions according to the invention in non-driven, i.e. passive rear axles. The drive preferably takes place via a drive shaft in the form of a cardan shaft, which is connected to the drive of the vehicle.

Furthermore, the damper device of a wheel suspension according to the invention may allow damping along a damper axis, wherein the damper axis is inclined from the vertical of the vehicle with respect to the direction of travel of the vehicle toward the rear and/or towards the vehicle body. This is also referred to as so-called inclined spring parameters, which are preferably formed in a region of about 6° to about 8°. In other words, the damper device and hence also the damper axis are thus inclined inwardly and toward the rear in relation to the vehicle. The middle and upper portion of the damper device are then already inclined away from the wheel space, so that a potential for conflict in terms of the installation space exists mainly for the lower section and in particular for the wheel carrier connection of the damper device. The remaining portion of the damper device is already inclined away from the wheel space, so that mainly the wheel carrier connection is emphasized during positioning. Inclination with the inclined spring parameters furthermore improves damping, in particular when rolling over smaller obstacles, because blocking of the wheel is effectively prevented.

A further advantage is attained by designing the steerable wheel carrier of a wheel suspension according to the invention for a symmetrical or substantially symmetrical pivoting range with respect to the pivot axis. In particular, this pivoting range is formed within the range of about ±5°. A symmetrical design of the pivoting range is particularly advantageous when applied to both sides of the rear axle, i.e. to both wheel suspensions. Both sides have then the same pivoting range, so that an identical inclination angle of the wheel carrier and identical inclination angles of the wheels are available on both sides even for a full deflection. This improves the maneuverability without allowing slippage between the two wheels of the rear axle in the extreme positions of the pivoting range. This steered rear axle supports steering only in general and need not provide the full pivoting range, as is required for a front axle of a vehicle.

Another object of the present invention is a rear axle of a vehicle, with a left and a right wheel suspension, wherein both wheel suspensions are constructed according to the invention. Accordingly, a rear axle according to the invention has the same advantages as previously discussed in detail with reference to a wheel suspension according to the invention. Preferably, the two wheel suspensions are identical on both sides of the rear axle of the vehicle or essentially identical, i.e. they have the same or substantially the same features.

The present invention also provides a method for positioning the wheel carrier connection of a damper device for connection with a wheel carrier of a wheel suspension that can be steered over a pivoting range for mounting a wheel. Such method according to the invention includes the following steps:
Determining the wheel space of the wheel defined by the pivoting range of the wheel carrier,
Determining an attachment region of the wheel space, which has the greatest direct distance from the vehicle body of all areas of the wheel space facing the vehicle body, and
Positioning the wheel carrier connection in the attachment region.

The steps of the preceding method are designed in particular for a wheel suspension according to the invention. This preferably relates to a construction method which needs to perform, inter alia, the positioning of the wheel carrier connection in the wheel suspension. The wheel space can be determined manually as well as semi-automatically or fully automatically. When the construction of the wheel carrier is finished, the wheel space of the wheel can be defined by the pivoting range of a wheel affixed on the wheel carrier in a simulated movement through the pivoting range of the wheel, i.e. the pivoting of the wheel on the wheel carrier. The areas of the wheel space facing the vehicle body are checked with respect to the aforedescribed direct distance. The greatest direct distance allows the greatest installation space between the wheel space and the vehicle body, defining at this location the attachment area. The wheel carrier connection is then positioned during assembly in this attachment area. A method according to the invention is preferably utilized in the construction for a wheel suspension according to the present invention. Accordingly, an inventive method then provides the same advantages as those already explained in detail with reference to a wheel suspension according to the invention.

BRIEF DESCRIPTION OF THE DRAWING

The present invention, its embodiments and its advantages will now be explained in more detail with reference to the accompanying drawings. These show schematically in.

DETAILED DESCRIPTION OF PREFERRED EMBODIMENTS

Figure 1:
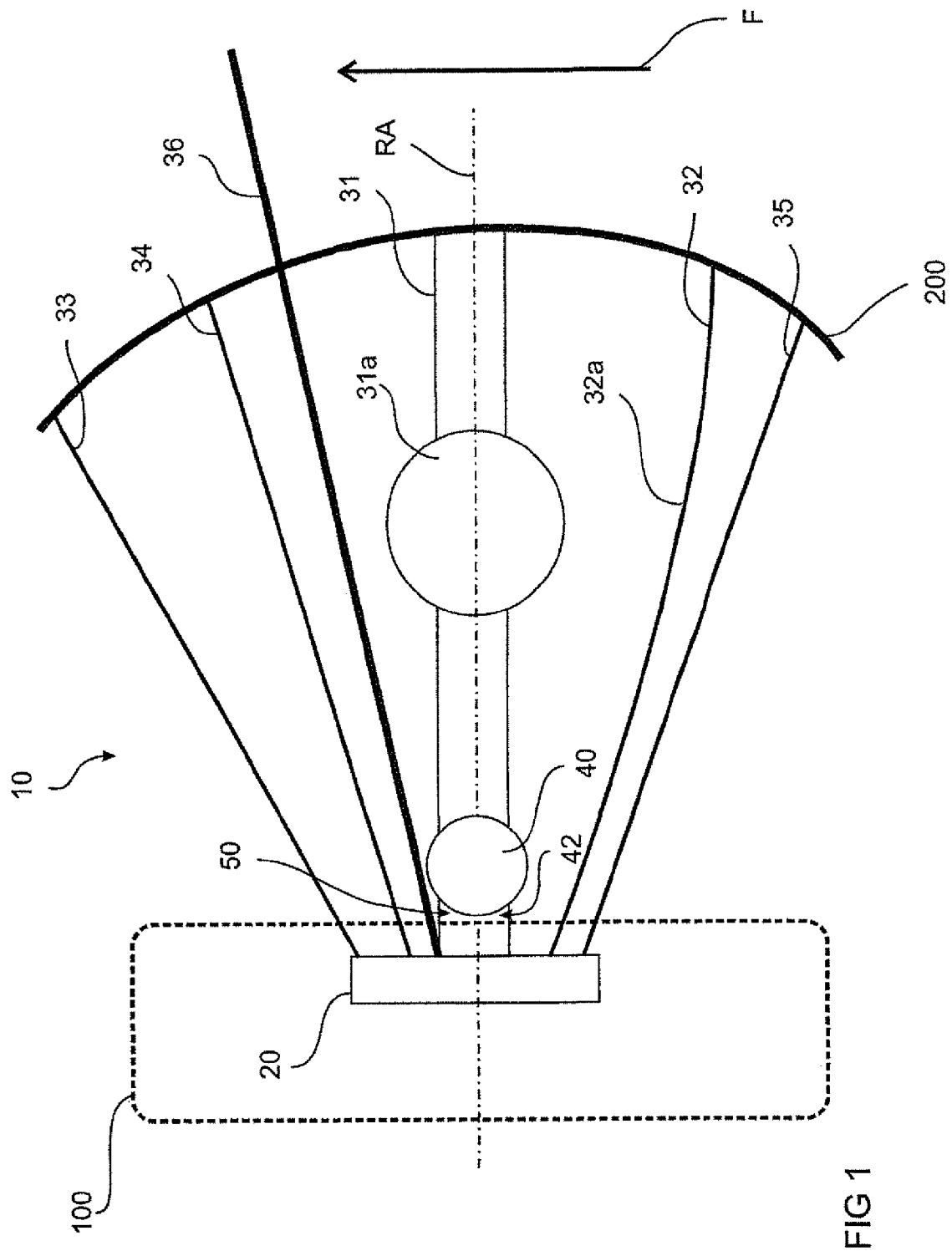
FIG. 1 a first embodiment of a wheel suspension according to the invention in a plan view,
FIG. 2, the wheel suspension according to the invention of FIG. 1 with an illustrated wheel space and the extreme positions of the wheel, and
FIG. 3 the embodiment of FIGS. 1 and 2 in a rear view.
Figure 2:
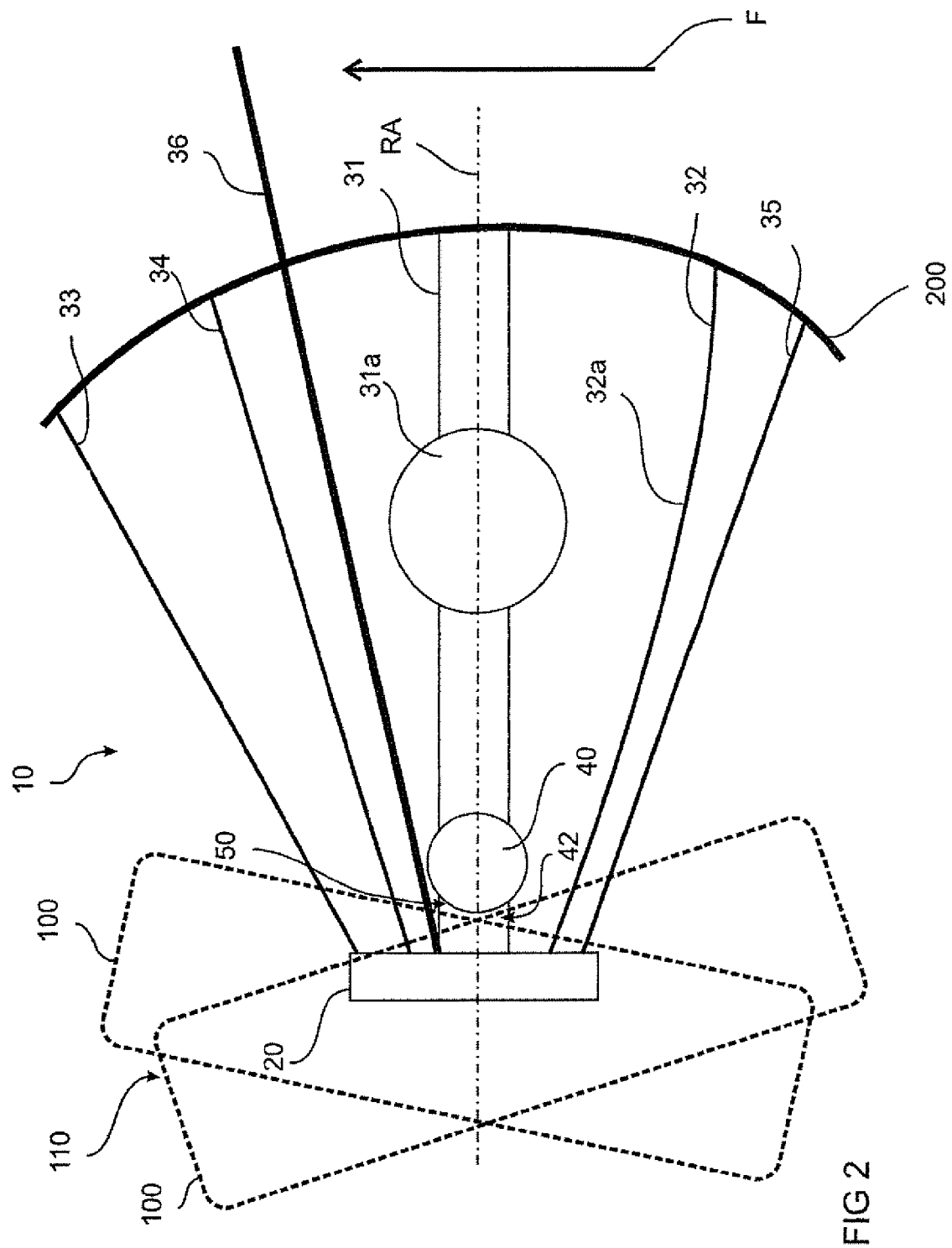
Figure 3:
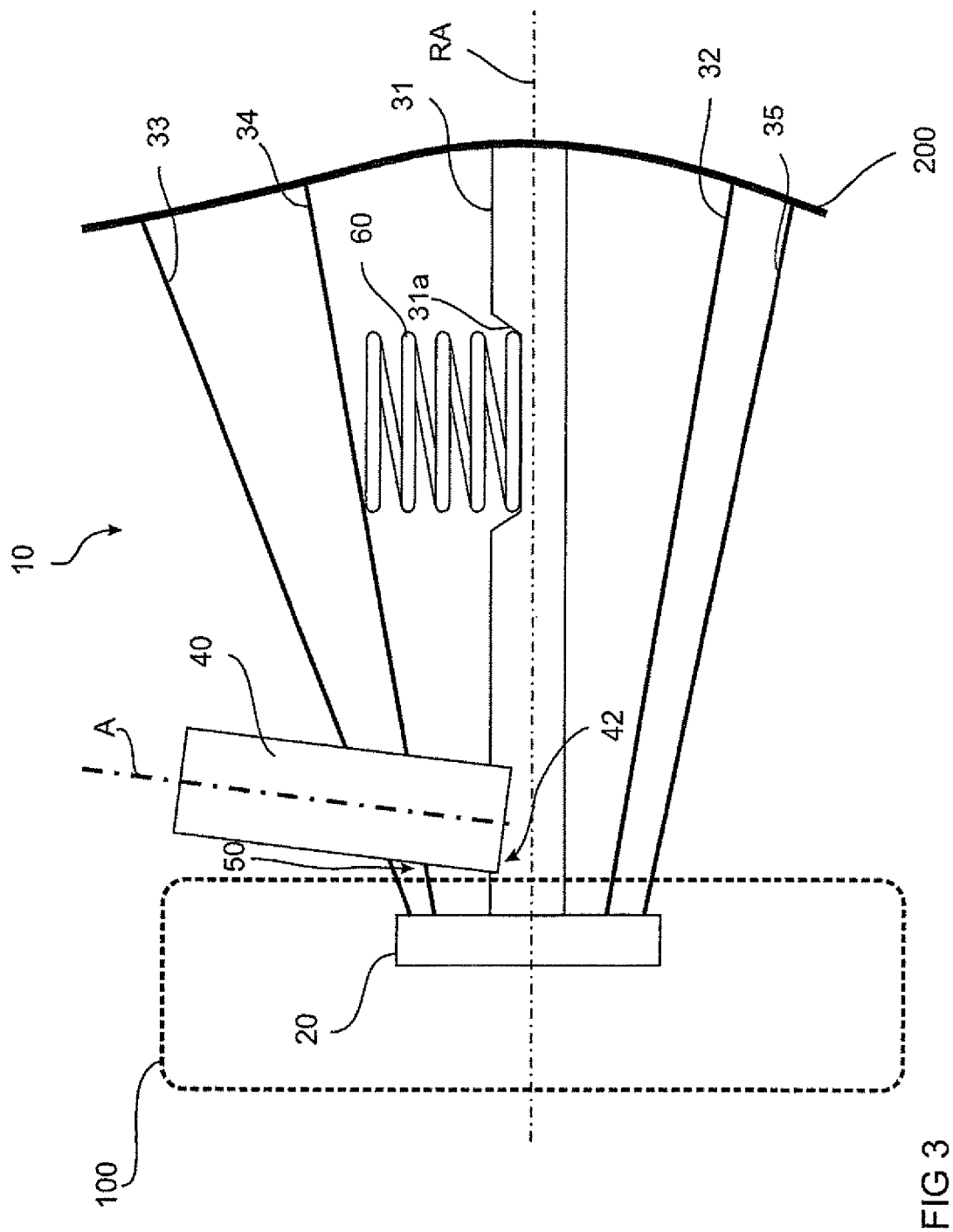

Elements having the same function and functionality are indicated in FIGS. 1 to 3 with the same reference symbols.

An embodiment of a wheel suspension 10 according to the invention will now be explained with reference to FIGS. 1 through 3. This wheel suspension 10 is a five-arm articulated wheel suspension because five arms 31, 32, 33, 34 and 35 are provided. Preferably, two of these arms 31, 32, 33, 34 and 35 are formed as transverse control arms, two of these arms 31, 32, 33, 34 and 35 as trailing arms and one of these arms 31, 32, 33, 34 and 35 as a tracking arm or steering arm.

In addition to the connection via the connecting rods 31, 32, 33, 34 and 35, a drive shaft 36 in the form of a cardan shaft is provided in the embodiment of the wheel suspension 10 shown in FIGS. 1 to 3. This drive shaft is shown schematically and drives a wheel carrier 20. This embodiment, therefore, represents a rear axle of a vehicle, which has driven wheel suspensions 10 and hence driven wheel carriers 20.

According to the invention, the wheel suspension 10 of this embodiment was constructed as follows. After defining the location of the wheel carrier 20, a wheel 100 was mounted on the wheel carrier 20 in the simulation. Subsequently, the wheel 100 was moved over all extreme regions and intermediate portions between the extreme regions, wherein both extreme positions of the wheel 100 are depicted in FIG. 2. A wheel space 110 is formed by moving across all sections between these extreme positions, which can be compared overall with a torus having a closed interior space. An area can be found in the saddle space of this wheel space 110, which has the greatest direct distance from all areas of the wheel space 110 oriented towards the vehicle body 200. The term direct distance refers to the respective distance between the respective area of the wheel space 110 and vehicle body 200. The longest distance of these direct distances then defines the largest space in this direction, in which the wheel carrier connection 42 of the damper device 40 was subsequently positioned.

As is particularly evident from FIGS. 1 and 2, the damper device 40 could be positioned in this manner so as to be optimally positioned proximate to the wheels near the wheel space 110. This was made possible by the inventive positioning in the attachment region 50. Positioning the damper device 40 closest to the wheel and hence far outward does not only improve the response and damping characteristics, but allows in addition an ideal utilization of the available space of the wheel suspension 10, thus enabling the vehicle to maintain the track width and simultaneously the through-load width in the direction of the width dimensional chain, i.e., in a direction transversely to the direction of travel F of the vehicle.

In the embodiment of the wheel suspension 10 shown in FIGS. 1 to 3, a separate spring device 60 is provided in addition to the damper device 40. The spring device 60 is provided farther inwardly in the direction of the vehicle body 200 in a cup-shaped receptacle 31a of the control arm 31. The damper device 40 is supported in the same control arm 31 so that the wheel carrier connection 42 between damper 40 and the wheel carrier 20 is provided indirectly via this control arm 31.

As is also evident from FIG. 3, the overall height of the entire wheel suspension 10 is reduced by separating the spring device 60 from the damper device 40 from each other. This allows a reduction of the available space without adversely affecting the width dimensional chain of the wheel suspension 10, since free space for the separate spring device 60 was created proximate to the wheel by the inventive positioning of the damper device 40.

According to the invention, the damper device 40 is angled or inclined position both in the direction of the vehicle body 200 and in relation to the wheel axle RA. Also, inclination toward the rear, i.e. opposite to the direction of travel F, can be advantageous according to the invention when considering the damper axis A.

Moreover, FIG. 2 and FIG. 1 show a curved portion in 32a in the control arm 32, which curves outwardly, i.e. away from the attachment region 50, away from the damper device 40 and away from the spring device 60, thereby creating or enlarging the available space for these individual components.

The foregoing explanation of the embodiment describes the present invention only in the context of examples. Of course, individual features of the embodiment, as long as technically viable, may be freely combined with each other, without departing from the scope of the present invention.

What is claimed is:

1. A wheel suspension for a rear axle of a vehicle, comprising:
    a wheel carrier for affixing a wheel, with the wheel carrier together with the wheel being steerable in a pivoting range about a steering axis and being pivotable about a spring compression of the rear axle, with the pivoting range and the spring compression defining a wheel space of the wheel, which is taken up by the wheel during movements of the wheel between extreme positions in the pivoting range and the spring compression,
    a plurality of control arms for articulating the wheel carrier on a vehicle body of the vehicle,
    a damper device for damping movement of the wheel carrier relative to the vehicle body, said damper device being arranged on one of the control arms in an attachment region defined by a surface section of the wheel space that has a greatest direct distance from the vehicle body of all areas of the wheel space facing the vehicle body,
    wherein the wheel space of the wheel defined by the pivoting range of the wheel carrier is formed symmetrical to a plane of symmetry aligned with the steering axis, wherein the wheel carrier connection of the damper device is disposed in the plane of symmetry, and
    a spring device for springily affecting the movement of the wheel carrier relative to the vehicle body, said spring device being arranged separate from the damper device on said one of the control arms on a wheel-carrier-distal side of the damper device.

2. The wheel suspension of claim 1, wherein said one of the control arms comprises a cup-shaped receptacle supporting the spring device.

3. The wheel suspension of claim 1, wherein said one of the control arms comprises a curved portion which due to the curvature creates or increases an installation space for the damper device.

4. The wheel suspension of claim 1, wherein the wheel carrier connection is arranged such that a ratio between a stroke of the wheel carrier during the relative movement of the wheel in relation to the vehicle body and a resulting stroke of the damper device is greater than 0.51.

5. The wheel suspension of claim 1, further comprising a drive shaft driving the wheel carrier.

6. The wheel suspension of claim 1, wherein a damper axis is inclined from a vertical direction of the vehicle and in relation to a direction of travel of the vehicle toward a rearward direction or toward the vehicle body, or both, with the damper device configured to dampen along the damper axis.

7. A rear axle of a vehicle, comprising:
    a left wheel suspension and a right wheel suspension, wherein each of the left wheel suspension and the right wheel suspension is constructed to comprise
    a wheel carrier for affixing a wheel, with the wheel carrier together with the wheel being steerable in a pivoting range about a steering axis and being pivotable about a spring compression of the rear axle, with the pivoting range and the spring compression defining a wheel space of the wheel, which is taken up by the wheel during movements of the wheel between extreme positions in the pivoting range and the spring compression,
    a plurality of control arms for articulating the wheel carrier on a vehicle body of the vehicle,
    a damper device for damping movement of the wheel carrier relative to the vehicle body, damper device being arranged on one of the control arms in an attachment region defined by a surface section of the wheel space that has a greatest direct distance from the vehicle body of all areas of the wheel space facing the vehicle body, wherein the wheel space of the wheel defined by the pivoting range of the wheel carrier is formed symmetrical to a plane of symmetry aligned with the steering axis, wherein the wheel carrier connection of the damper device is disposed in the plane of symmetry, and a spring device for springily affecting the movement of the wheel carrier relative to the vehicle body, said spring device being arranged separate from the damper device on said one of the control arms on a wheel-carrier-distal side of the damper device.

8. A method for positioning a on a control arm having a spring device for springily affecting the movement of a wheel carrier relative to the vehicle body, for establishing a connection to the wheel carrier of a wheel suspension having an attached wheel, said wheel carrier being steerable in a pivoting range formed symmetrical to a plane of symmetry aligned with a steering axis and being pivotable about a spring compression of the rear axle, the method comprising:

determining a wheel space of the wheel, with the wheel space being defined by the pivoting range of the wheel carrier about the steering axis and the spring compression of the rear axle, determining an attachment region of surface sections of the wheel space, wherein the attachment region has a greatest direct distance from a vehicle body of all areas of the wheel space facing the vehicle body, positioning the damper device on the control arm in the attachment region, and arranging the spring device separate from the damper device on said control arm on a wheel-carrier-distal side of the damper device.

9. The method of claim 5, wherein the wheel suspension comprises a plurality of control arms for articulating the wheel carrier on the vehicle body, and wherein the damper device dampens movement of the wheel carrier relative to the vehicle body.

* * * * *